(No Model.)
T. A. EDISON.
UTILIZING ELECTRICITY AS A MOTIVE POWER.
No. 248,435. Patented Oct. 18, 1881.
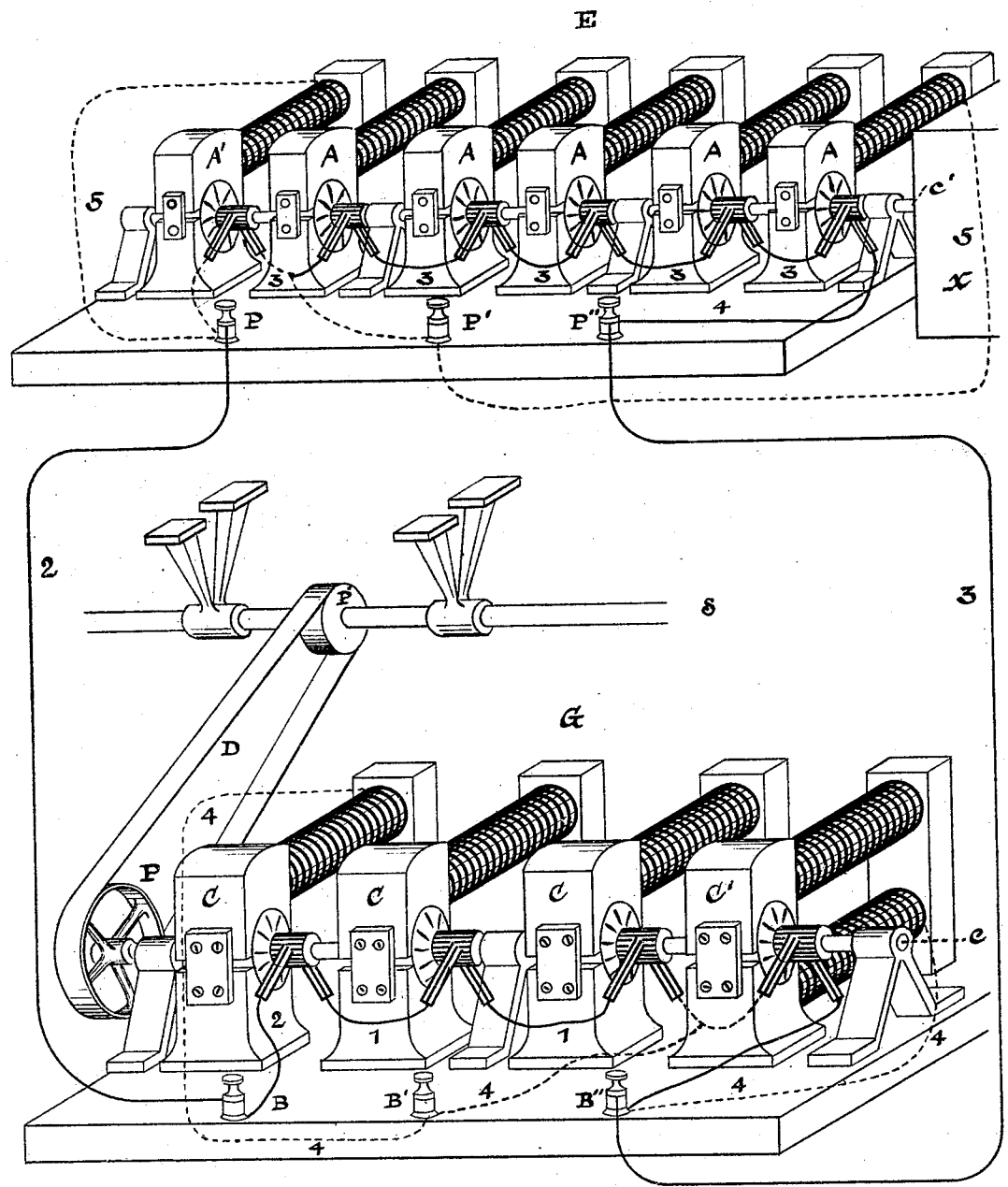

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

UTILIZING ELECTRICITY AS A MOTIVE POWER.

SPECIFICATION forming part of Letters Patent No. 248,435, dated October 18, 1881.

Application filed October 1, 1880. (No model.) Patented in Canada March 31, 1881.

*To all whom it may concern:*

Be it known that I, THOMAS A. EDISON, of Menlo Park, in the county of Middlesex and State of New Jersey, have invented a new and useful Method of and Means for Utilizing Electricity as a Motive Power; and I do hereby declare that the following is a full and exact description of the same, reference being had to the accompanying drawings, and to the letters of reference marked thereon.

Some method by which power could be readily and economically transferred to a distance from a prime motor has long been felt to be desirable, and to that end many suggestions have been made and plans devised involving its transfer by ropes, by compressed air, and by electricity. Practically it has been determined that the power of a prime motor may be converted into electricity and the electricity conveyed to a distance, to be retranslated into power, this, however, only to a limited extent and by the use of very large conductors; for to transmit power to any great distance without the use of large and costly conductors requires that the current should have very great electro-magnetic force or "pressure"—say as much as two to three thousand volts. In practice, with magneto or dynamo electric machines as now built, it is impracticable to generate currents of such high electro-motive force. These machines have but a single bobbin, and the difference of potential between one section of wire upon the bobbin and another would be very great. Against so great a difference of potential it is extremely difficult to guard, even by the most careful winding and insulation. The result, especially in damp weather or when the bobbins become damp, is that the currents break a short path from section to section, burning the wires. In addition, such great electro-motive force causes a large increase of destructive spark at the commutators. If currents of such electro-motive force could be safely and economically generated and translated, exceedingly small and inexpensive conductors, relatively, could be used to transfer, without material loss, a very large amount of power—say several hundred horse-power.

One object of this invention, then, is to furnish means and methods by which this transmission may be made. To accomplish these results a battery of generators is used, each separate and complete in itself, but with all the rotating armatures or bobbins (each provided with its own commutator) mounted upon the same driving-shaft, the total electro-motive force of all the bobbins being equal to the electro-motive force desired. By thus dividing it between a number of bobbins it is lessened in each bobbin, with a consequent reduction of difference of potential between the layers or sections on each bobbin. The motors or re-translating-engines are divided up in the same way, all the bobbins, each having its own armature, being mounted upon the one driving-shaft, upon which they all exert their force.

By the arrangement thus generally stated it is possible and commercially practicable to convert even several thousand horse-power of a prime motor into electricity, convey the electricity by moderate-sized or even small conductors to a distance, there to be reconverted into power. In addition I have discovered that for the best results certain relations must exist between the generators and engines.

In using generators to produce a current which is supplied to an electric-engine, the practice hitherto has been to make the generator or transmitting-machine and the engine or receiving-machine exactly alike, so that when each is rotating at same speed the contrary electro-motive force of the receiver exactly equals the electro-motive force of the generator. In such cases, when no work is being done, the tendency of the engine or receiver is to acquire that rate of speed which is necessary to make the counter and prime electro-motive force about equal. As work is given the engine to do, its speed, and consequently its counter electro-motive force, is reduced; but where both are made alike and have, when doing no work, equal forces, it has not been found desirable to load the engine or receiver beyond the point reducing its speed, and consequently its counter electro-motive force, more than one-half. The difference between the electro-motive force and the counter electro-motive force (of course, less friction, &c.) represents the amount of current transferred into power, which in most cases is not more than fifty per cent.

Instead of the arrangement described, I wind the bobbins of the receiving machines or engines, so that when driven at the same speed as the generators or transmitters their counter electro-motive force shall be about one-half that of the transmitters. This is accomplished by winding the engine or motor bobbins with a wire coarser and of less length, either or both, than that used in the generator-bobbins. The consequence is that less wire cuts the lines of force in the engine or motor than in the generator upon each rotation of the bobbins. Consequently to have the same amount of wire cut the lines of force in both cases the engine or motor bobbins must be rotated at much higher speed. Unloaded, then, as their tendency is to run at the rate which shall develop the same electro-motive force, they rotate at twice the speed of the generators. Now, if they are so loaded with work as to reduce their speed to the same as that of the transmitters, they develop only half their unloaded counter electro-motive force, turning fifty per cent. into power at that rate. It is preferable to load the engines with work only to that point which permits of a speed not less than that of the generator, and usually somewhat greater, so that the counter electro-motive force developed shall be about seventy-five per cent. of the prime electro-motive force, at about which point is the greatest economical conversion into force. In connecting up the generators and engines the same plans may be followed in both.

As stated in a previous application, but a small current is required to keep up to the point of magnetic saturation field-magnets once brought to that point. When all the current generated is taken through the coils of the field-of-force magnets there is many times as much current as is needed for the purpose, and the resistance of the field-coils is uselessly added to the circuit of the current. Consequently I prefer to use only a part of the current, arranging a shunt-circuit to the bobbin of one or all the machines, which shunt passes around and energizes the fields of the whole series. The resistance of the fields is proportional to the electro-motive force of the bobbin, so that only the proper proportion of current will pass through the shunt—that is, just enough to keep the field-magnets up to the point of economical magnetic saturation.

In the drawing is shown the arrangement described as far as may be shown in a drawing.

E is a battery of generators, which may be of any desired number, six, A A A A A A', being shown, their rotating armatures or bobbins and commutators being upon a shaft, $c'$, common to them all, which is driven from any suitable prime motor, (represented arbitrarily by $x$.) In this case the bobbins of the entire battery are connected in a series by wires 3 3, extending from the commutator-brush of one generator to that of the next, conductors 2 3, attached to the terminal binders of the battery, leading to and from the battery G of engines or translating devices. From the commutator-connections of A' a shunt-circuit is formed, 5 5, which passes through the coils of all the field-of-force magnets of the series.

G is a battery of engines or receivers, C C C C', having bobbins wound, as explained, so as to have, when doing no work, a speed of twice that of the bobbins of the generators, in order to develop a counter electro-motive force equal to the electro-motive force of the generators. The bobbins and commutators are placed on a shaft, $c$, common to them all, which shaft is suitably connected to the machinery to be driven, which connection is represented in this instance by pulley P on shaft $c$, belt D, and pulley P' on shaft S, which conveys the power to the driven machines. The current comes from the generators, say, by wire 2, passes to the commutator of the first engine C, thence by wires $1_11$, through the commutators of the remainder in series, and by wire 3 back to generators. A shunt circuit, 4, to the commutator of C' leads through the coils of all the field-of-force magnets, the resistances of the shunts in both instances being proportioned as hereinbefore explained.

Instead of the generators and engines being arranged in series, as shown, they may, if deemed desirable, be arranged, either or both, on the multiple-arc system, in which cases the relative resistances of the parts must be adjusted to compensate for the difference in resistance of the circuit inherent upon arrangement of devices in series or in derived circuits.

The engines of the battery G need not be located at one place, as shown, but may be distributed—as, for instance, through a village, which is remote from the source of supply or station where E is located. In such case a small dynamo may be placed in the circuit 2 at the village or locality and the current therefrom used to excite the field-magnets of the engines, a local circuit leading from and to the dynamo through all the field-coils of the engines there located.

Instead of the bobbins being wound differently, so as to require different speeds for the same electro-motive forces, the number of engines or receiving machines used may be less than that of the generators. For instance, as shown in the drawing, with six generators four engines may be used with the result, in order to give same electro-motive forces, that the receivers run with much greater speed than the generators.

What I claim is—

1. The combination of a magneto or dynamo electric machine and an electric engine, constructed relatively to each other so that the engine must run at a much greater speed than the magneto or dynamo electric machine to produce a counter electro-motive force equaling the electro-motive force of the dynamo or electro magnetic machine, substantially as set forth.

2. The method of transferring power into electricity and reconverting the electricity into power, consisting in generating the current in dynamo or magneto electric machines, or in a battery thereof, giving at a certain speed a certain electro-motive force, transmitting the current to an electric engine or motor or series thereof, arranged to give the same electro-motive force, only at a much higher rate of speed, substantially as set forth.

3. The combination, with the main circuit of a series or battery of magneto or dynamo electric machines, used either as generators or receiving-machines, of a shunt-circuit to the bobbin or armature of one of the machines, which shunt passes around and energizes all the field-of-force magnets of the battery, substantially as set forth.

This specification signed and witnessed this 12th day of August, 1880.

THOS. A. EDISON.

Witnesses.
   C. P. MOTT,
   WM. CARMAN.